US008209347B1

(12) United States Patent
Sahami et al.

(10) Patent No.: US 8,209,347 B1
(45) Date of Patent: *Jun. 26, 2012

(54) GENERATING QUERY SUGGESTIONS USING CONTEXTUAL INFORMATION

(75) Inventors: Mehran Sahami, Palo Alto, CA (US); Timothy D. Heilman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,964

(22) Filed: Jul. 13, 2011

Related U.S. Application Data

(63) Continuation of application No. 12/761,075, filed on Apr. 15, 2010, now Pat. No. 8,015,199, which is a continuation of application No. 11/195,397, filed on Aug. 1, 2005, now Pat. No. 7,725,485.

(51) Int. Cl.
 *G06F 7/00* (2006.01)
 *G06F 17/30* (2006.01)
(52) U.S. Cl. ...................................... 707/767; 707/730
(58) Field of Classification Search ........................ None
 See application file for complete search history.

(56) References Cited

U.S. PATENT DOCUMENTS

| | | | |
|---|---|---|---|
| 5,647,058 A | | 7/1997 | Agrawal et al. |
| 5,864,846 A * | | 1/1999 | Voorhees et al. ................. 1/1 |
| 5,943,670 A | | 8/1999 | Prager |
| 5,974,412 A * | | 10/1999 | Hazlehurst et al. ............... 1/1 |
| 6,189,002 B1 * | | 2/2001 | Roitblat ............................ 1/1 |
| 6,236,768 B1 | | 5/2001 | Rhodes et al. |
| 6,269,368 B1 | | 7/2001 | Diamond |
| 6,289,353 B1 | | 9/2001 | Hazlehurst et al. |
| 6,480,843 B2 * | | 11/2002 | Li ................................... 1/1 |
| 6,484,162 B1 | | 11/2002 | Edlund et al. |
| 6,523,026 B1 | | 2/2003 | Gillis |
| 6,654,742 B1 | | 11/2003 | Kobayashi et al. |
| 6,829,599 B2 * | | 12/2004 | Chidlovskii ..................... 1/1 |
| 7,251,637 B1 * | | 7/2007 | Caid et al. .................. 706/15 |
| 2001/0013035 A1 * | | 8/2001 | Cohen ........................... 707/5 |
| 2002/0042793 A1 | | 4/2002 | Choi |
| 2002/0073079 A1 | | 6/2002 | Terheggen |
| 2002/0103798 A1 | | 8/2002 | Abrol et al. |
| 2002/0103799 A1 | | 8/2002 | Bradford et al. |
| 2002/0123989 A1 | | 9/2002 | Kopelman et al. |
| 2002/0129015 A1 | | 9/2002 | Caudill et al. |

(Continued)

OTHER PUBLICATIONS

Relevant Term Suggestion in Interactive Web Search Based on Contextual Information in Query Session Logs, Huang et al., Journal of American Society for Information Science and Technology, 54(7), 638-649, 2003.*

(Continued)

*Primary Examiner* — Pierre Vital
*Assistant Examiner* — Augustine K Obisesan
(74) *Attorney, Agent, or Firm* — Fish & Richardson P.C.

(57) ABSTRACT

A search engine receives a query from an end-user. The search engine executes the query on a content database and identifies a set of matching content. The search engine utilizes the matching content to generate a query vector describing the end-user query. The search engine searches a repository of other vectors, called "centroids," to produce a ranked set of centroids matching the query vector. These centroids are converted into search queries and form a set of candidate queries. The search engine filters the candidate queries to identify ones that are likely to be meaningful to the end-user. The selected candidate queries are returned to the end-user as query suggestions.

21 Claims, 5 Drawing Sheets

U.S. PATENT DOCUMENTS

| | | | | |
|---|---|---|---|---|
| 2002/0147724 | A1* | 10/2002 | Fries et al. | 707/100 |
| 2003/0050921 | A1 | 3/2003 | Tokuda et al. | |
| 2003/0149727 | A1 | 8/2003 | Jaschek et al. | |
| 2003/0167267 | A1 | 9/2003 | Kawatani | |
| 2004/0044661 | A1 | 3/2004 | Allen et al. | |
| 2004/0054666 | A1 | 3/2004 | Lapir et al. | |
| 2004/0068486 | A1 | 4/2004 | Chidlovskii | |
| 2004/0158569 | A1* | 8/2004 | Evans et al. | 707/100 |
| 2004/0181525 | A1 | 9/2004 | Itzhak et al. | |
| 2004/0220944 | A1 | 11/2004 | Behrens et al. | |
| 2004/0267723 | A1 | 12/2004 | Bharat | |
| 2005/0055341 | A1 | 3/2005 | Haahr et al. | |
| 2005/0080772 | A1 | 4/2005 | Bem | |
| 2005/0114313 | A1 | 5/2005 | Campbell et al. | |
| 2005/0138067 | A1* | 6/2005 | Billsus et al. | 707/104.1 |
| 2005/0234879 | A1 | 10/2005 | Zeng et al. | |
| 2005/0234953 | A1* | 10/2005 | Zhang et al. | 707/101 |
| 2006/0259455 | A1* | 11/2006 | Anderson et al. | 707/1 |
| 2008/0040314 | A1 | 2/2008 | Brave et al. | |
| 2009/0265346 | A1 | 10/2009 | Kadayam et al. | |

OTHER PUBLICATIONS

Cristianini, N. et al., "Latent Semantic Kernels", Proceedings of the 18th International Conference on Machine Learning (ICML-01), 2001, 27 pages.

Harman, D., "Relevance Feedback and Other Query Modification Techniques", Ed. Frakes, W. et al., "Information Retrieval, Data Structures and Algorithms", Jun. 2, 1992, pp. 241-263. Prentice Hall PRT, Upper Saddle River, NJ.

Kandola, J. et al., "Learning Semantic Similarity", Advances in Neural Information Processing Systems, 2003, vol. 15, 8 pages.

Lodhi, H. et al., "Text Classification using String Kernels", Journal of Machine Learning Research 2, Feb. 2002, pp. 419-444, MIT Press, Cambridge, MA.

Velez, B. et al., "Fast and Effective Query Refinement", ACM SIGIR Forum, 1997, pp. 6-15, vol. 31, Issue SI, ACM Press, New York, NY.

Vinokourov, A. et al., "Inferring a Semantic Representation of Text via Cross-Language Correlation Analysis", Advances of Neural Information Processing Systems 15, 2003, 8 pages, MIT Press, Cambridge, MA.

Centroid-Based Document Classification: Analysis & Experimental Results, Eui-Hong(Sam) et al, 4th European Conference on Principles and Practice of Knowledge Discovery in Databases (PKDD), pp. 424-431, 2000.

SVD Based Term Suggestion and Ranking System, Gleich et al., Proceedings of the Fourth IEEE International Conference on Data Mining (ICDM '04), 2004.

Relevant term suggestion in interactive web search based on contextual information in query session logs, Huang et al (2003 Wiley periodicals, Inc. Journal of the American Society for Information Science and Technology, 54(7); 638-649).

Query recommendation using query logs in search engines, Baeza-Yates et al (EDBT 2004 Workshops, LNCS 3268, pp. 588-596, 2004).

* cited by examiner

GENERATING QUERY SUGGESTIONS USING CONTEXTUAL INFORMATION

CROSS REFERENCES TO RELATED APPLICATIONS

This application is a continuation application of and claims priority under 35 U.S.C. §120 to U.S. patent application Ser. No. 12/761,075, filed Apr. 15, 2010 now U.S. Pat. No. 8,015,199, which is a continuation of Ser. No. 11/195,397, filed on Aug. 1, 2005, now U.S. Pat. No. 7,725,485. The entire contents of both applications are incorporated herein by reference in their entirety.

BACKGROUND OF THE INVENTION

1. Field of the Invention

This invention pertains in general to content search engines and in particular to generating alternative queries to suggest to the searcher.

2. Description of the Related Art

People looking for information on the Internet often use a search engine to further their research. In order to execute queries on the search engine, people typically search using a set of keywords that they think are likely to produce the desired information. For various reasons, people often do not choose the best keywords for their searches.

Language difficulties might cause a person to search using the wrong keywords. A person who lacks familiarity with the language of the content being searched might use the wrong keywords. Even a person who is familiar with the language of the content might make mistakes. For example, a British citizen who seeks information about temporarily obtaining a car in the United States might search "car for hire" rather than "car for rent." The latter query more accurately reflects conventional usage in United States English and is likely to produce better search results.

In order to assist the person conducting the search, a search engine can suggest additional queries to the searcher. There are a variety of technologies the search engine can use to identify the additional queries, and each of these technologies will typically result in a large set of queries that the engine can potentially suggest. Presenting the entire set is often not helpful because many of the queries are likely to produce substantially the same results as the initial query.

Therefore, there is a need in the art for a way to suggest queries that are likely to provide meaningful results to the person conducting the search.

BRIEF SUMMARY OF THE INVENTION

The above need is met by a system, computer program product, and method that filter a list of candidate query suggestions to identify a set of suggestions that are likely to be meaningful to the person conducting the search.

In accordance with an aspect of the invention, a system or computer program product includes a search query execution engine that searches a database for content matching a query. A query candidate generation module generates a set of candidates in response to the content matching the query. A filtering module then produces a set of suggestions by filtering the set of candidates.

In accordance with an aspect of the invention, a method includes searching a database for content matching a query, generating a set of candidates in response to the content matching the query, and producing a set of suggestions by filtering the set of candidates.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A. Overview

Figure 1:
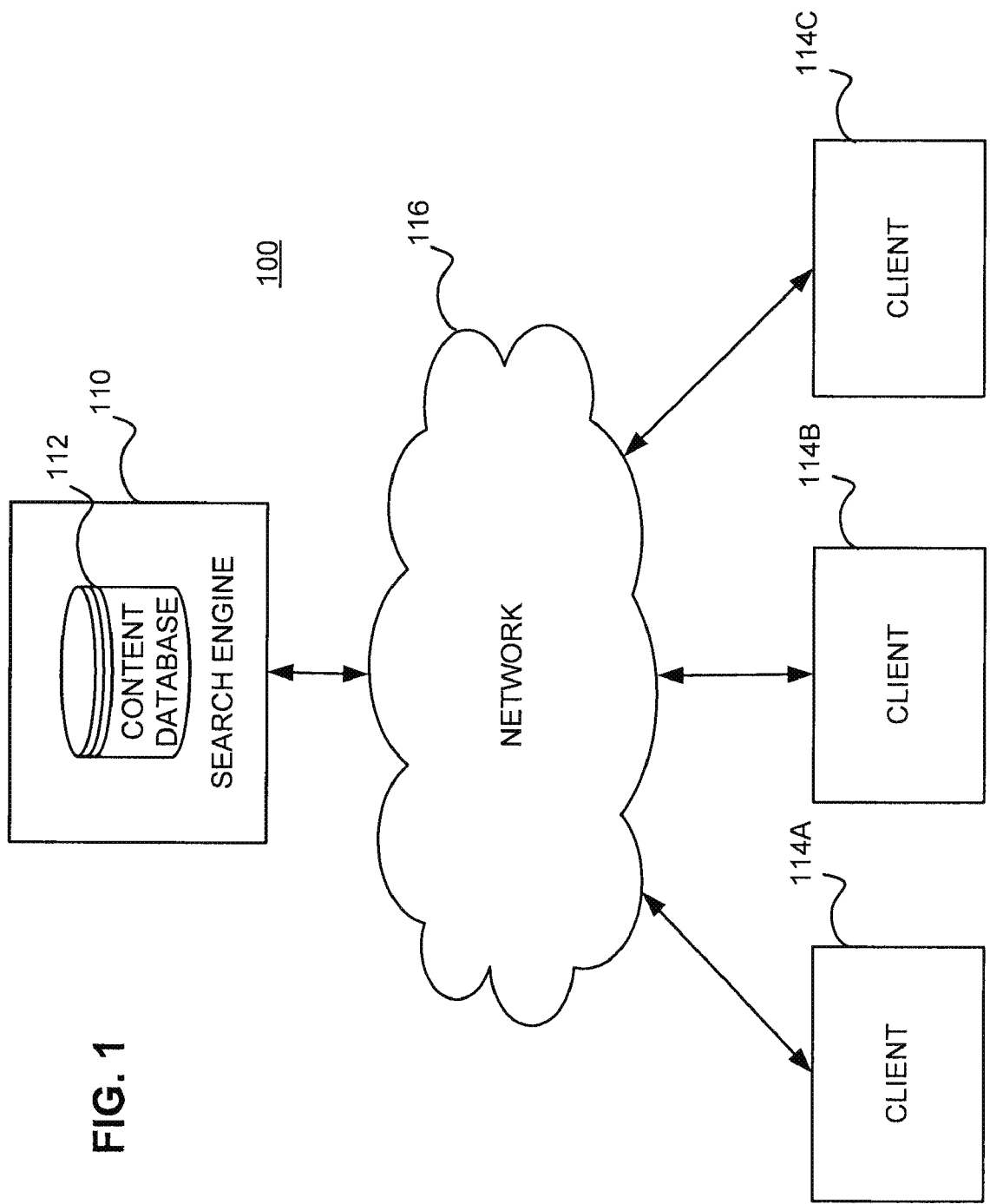
FIG. 1 is a high-level block diagram of a computing environment according to one embodiment of the present invention.

FIG. 1 is a high-level block diagram of a computing environment 100 according to one embodiment of the present invention. The environment includes a search engine 110 having a content database 112, multiple clients 114, and a network 116 connecting the search engine and the clients. Only three clients 114 are shown in FIG. 1 for purposes of clarity, but those of skill in the art will recognize that typical environments can have thousands or millions of clients 114, and can also have multiple search engines 110. There can also be other entities connected to the network 116 beyond those shown in FIG. 1.

FIG. 1 and the other figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

The network 116 enables data communication between and among the entities shown in FIG. 1 and in one embodiment is the Internet. In another embodiment, the network 116 is a local area network (LAN) or wide area network (WAN) operated by an enterprise and is not necessarily coupled to the Internet. In one embodiment, the network 116 uses standard communications technologies and/or protocols. Thus, the network 116 can include links using technologies such as Ethernet, 802.11, integrated services digital network (ISDN), digital subscriber line (DSL), asynchronous transfer mode (ATM), etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 116 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The search engine 110 receives queries from the clients 114, executes the queries against the content database 112, and returns content and/or references to matching content in response. In some embodiments, the search engine 110 also returns alternative query suggestions. In general, these suggestions represent queries that the end-users of the clients 114 might want to execute in addition to, or instead of, the query actually executed.

The clients 114 are utilized by end-users to interact with the search engine 110. In one embodiment, a client 114 is a typical personal computer such as an IBM PC- or Apple Macintosh-compatible computer. In another embodiment, a client 114 is another type of electronic device, such as a cellular telephone, personal digital assistant (PDA), portable email device, etc. In one embodiment, a client 114 executes an application, such as a web browser, that allows the end-user to formulate queries and submit them to the search engine 110. The application provides an interface with which the end-user inputs specific queries and reviews results and/or suggestions returned by the search engine 110. The application can also provide other types of interfaces that generate explicit and/or implicit queries to the search engine 110. In embodiment, the search engine 110 itself executes as an application on a client 114.

II. System Architecture

Figure 2:
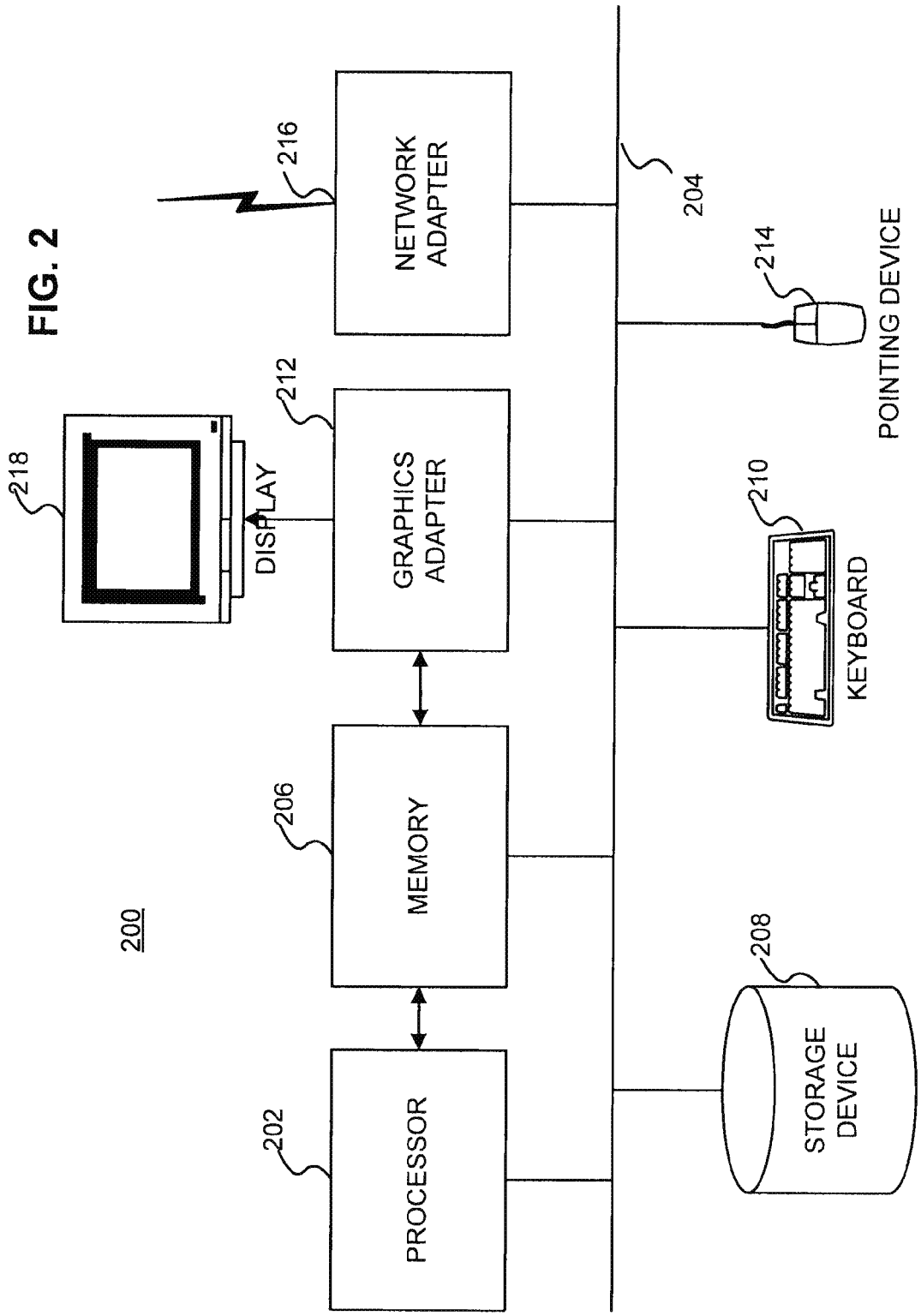
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 116.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, a client 114 typically requires less processing power and data storage than the search engine 110. Thus, the client 114 can be a standard personal computer system or cellular telephone. The search engine 110, in contrast, may comprise more powerful computers and/or multiple computers working together to provide the functionality described herein. These computers can be located together or distributed to multiple locations on the network 116.

Figure 3:
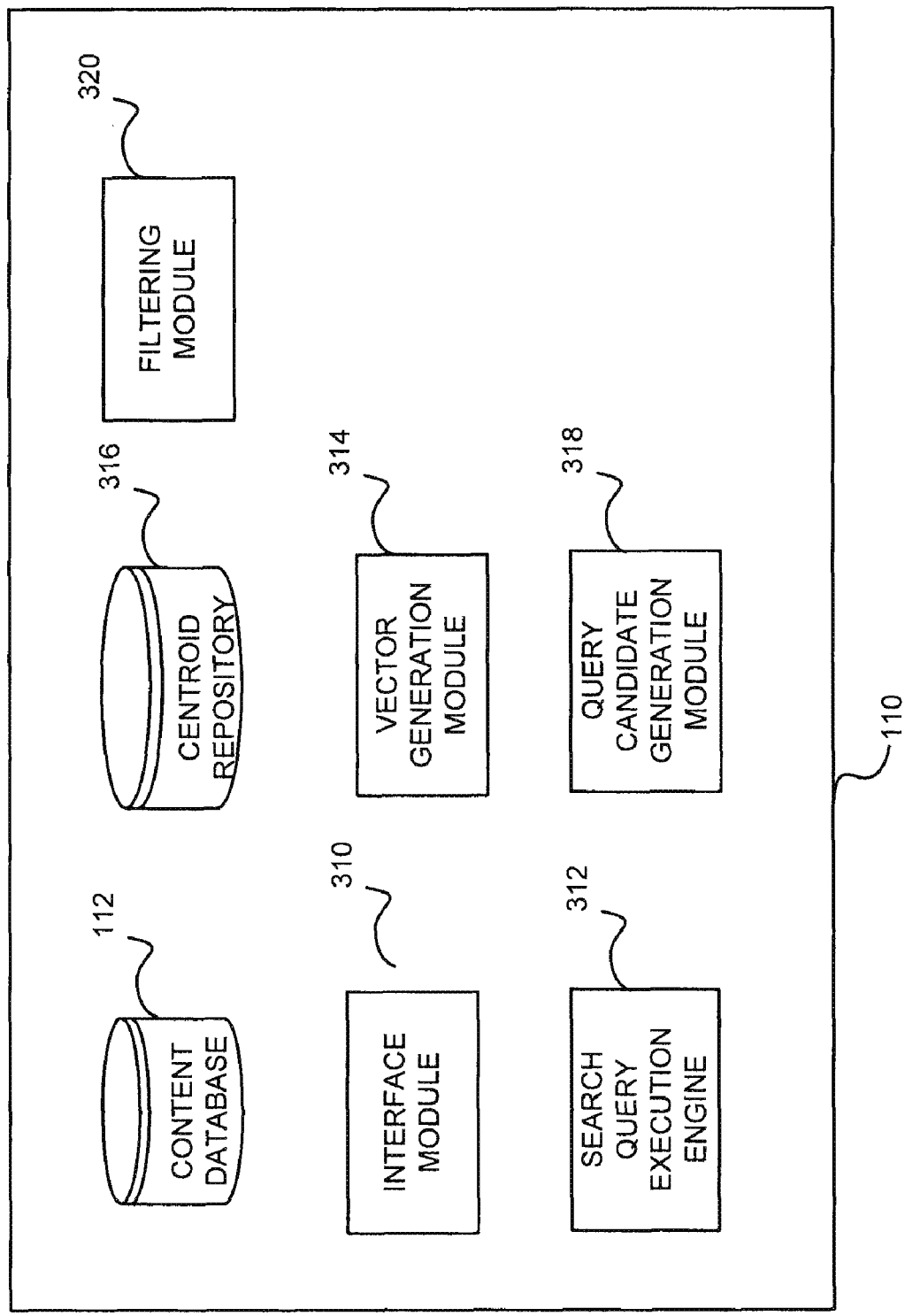
FIG. 3 is a high-level block diagram illustrating modules within the search engine according to one embodiment.

FIG. 3 is a high-level block diagram illustrating modules within the search engine 110 according to one embodiment. Those of skill in the art will recognize that other embodiments can have different and/or additional modules than those shown in FIG. 3. Likewise, the functionalities can be distributed among the modules in a manner different than described herein.

The content database 112 holds information describing web pages, images, videos, sounds, advertisements, documents and/or other types of content accessible via the network 116. The information is organized in a manner that allow the search engine 110 to quickly identify content matching a search query. In one embodiment, the content database 112 also stores a reference to a location of the content on the network 116, such as a uniform resource locator (URL) and/or directory path, so that the search engine 110 can identify matching content and return the reference to the content to a client 114. In some embodiments, the content database 112 also stores the content being searched. The stored content can include the original version of the content and/or a cached copy of content maintained at another location on the network 116.

An interface module 310 receives queries from the clients 114 and provides search results and/or suggested queries in response. In one embodiment, the queries received by the interface module 310 are comprised primarily of keywords. The queries can also include logical operators, meta-data describing types of content to search, etc. In other embodiments, the queries can be in another form, such as audio, video, images, etc. The results that the interface module 310 returns to the clients 114 can include content matching the queries, URLs and/or other references to matching content, and ads or other information related to the queries. In one embodiment, the suggested queries returned by the interface module 310 are sets of keywords that form new queries that can be executed by the search engine 110 if the end-user so desires.

A search query execution engine module 312 executes search queries against the content database 112 to identify matching content. Those of skill in the art will recognize that there are many different techniques that can be utilized to identify matching content. In one embodiment, a result of the search performed by the search query execution engine 312 is a set of ranked and ordered content. The content is often ordered with the most closely matching content first, although oftentimes it is desirable to order the content in another way, such as by date. For purposes of clarity, this description assumes that the content returned by the search query execution engine module 312 is a set of web pages containing text. Those of skill in the art will recognize that the techniques described herein can be utilized with forms of content other than textual web pages.

A vector generation module 314 converts an end-user query into a vector. In one embodiment, the vector generation module 314 creates the query vector by executing the query on the content database 112 and identifying the set of 'n' most highly-ranked web pages returned as results, where 'n' is an integer such as 50. This step is accomplished in one embodiment by monitoring the results of the search query execution engine 312 when it executes the end-user's query. The vector generation module 314 analyzes each web page and generates a term vector that describes it. In one embodiment, the vector generation module 314 truncates each term vector to include only its 'm' highest-weighted terms. The module 314 combines the 'n' term vectors containing the 'm' highest-weighted terms to produce a centroid, which is a vector that describes the most common terms of the set of 'n' web pages returned in response to the end-user query. In other words, the centroid contains a list of the most common and meaningful terms utilized in the pages that were identified in response to the end-user's query. The centroid is the end-user query vector. The end-user's original query can be reconstructed from the corresponding query vector. Further information regarding the generation of query vectors is found in U.S. patent application Ser. No. 10/419,692, filed Apr. 21, 2003, and No. 10/814,105, filed Mar. 31, 2004, both of which are hereby incorporated by reference herein.

A centroid repository 316 stores centroids produced in response to searches executed by the search engine 110. Assume for purposes of this description that the centroid repository 316 stores a large set of centroids produced using the technique described above. These centroids can be based on, for example, queries culled from real-world queries received by the search engine 110 during a given time period, a set of training queries fed to the search engine by an administrator, and/or hand-coded data.

A query candidate generation module 318 generates a set of candidate queries in response to an end-user query received by the interface module 310. In one embodiment, this module 318 generates the set of candidates by creating a disjunction of the 'n' (e.g., 3) most highly-weighted terms from the vector generated from the user query. For example, if 'n' is 3 and the most highly-weighted terms in the query vector are "car," "rental," and "Denver," the disjunction is "car OR rental OR Denver."

The query candidate generation module 318 executes a search against the centroid repository 316 for centroids matching the disjunction. This search produces a subset of centroids in the centroid repository 316 that match the disjunction. In one embodiment, the query candidate generation module 318 computes the dot product of each matching centroid against the query vector. The dot product describes the similarity between the two vectors.

The query candidate generation module 318 sorts the subset of centroids by dot product to produce a ranked list of centroids, where the most highly-ranked centroids most closely match the query vector. The module 318 converts at least some of the centroids back into their search query representations and thus produces a ranked list of search queries that tend to produce documents that include the same terms as the initial search query received from the end-user. These search queries represent potential query suggestions for the end-user and are referred to herein as "candidate queries."

A filtering module 320 filters the candidate queries produced by the query candidate generation module 318 to produce a set of meaningful suggestions. In some circumstances, the top-ranked candidate queries identified by the query candidate generation module 318 are not necessarily the most meaningful to the end-user. For example, if the end-user's query is "star wars," the two highest-ranked candidate queries might be "star war" and "star wars movie," neither of which is likely to provide more meaningful search results than the initial query. The filtering module 320 overcomes this issue by selecting meaningful queries.

The filtering module 320 builds a set of suggestion queries. In one embodiment, the filtering module 320 adds a candidate query to the set of suggestion queries if it contains a certain number of unique terms in view of the terms found in the original end-user query and the queries already added to the suggestion set. Each candidate query is considered in rank order until a desired number of suggestion queries is obtained.

Figure 4:
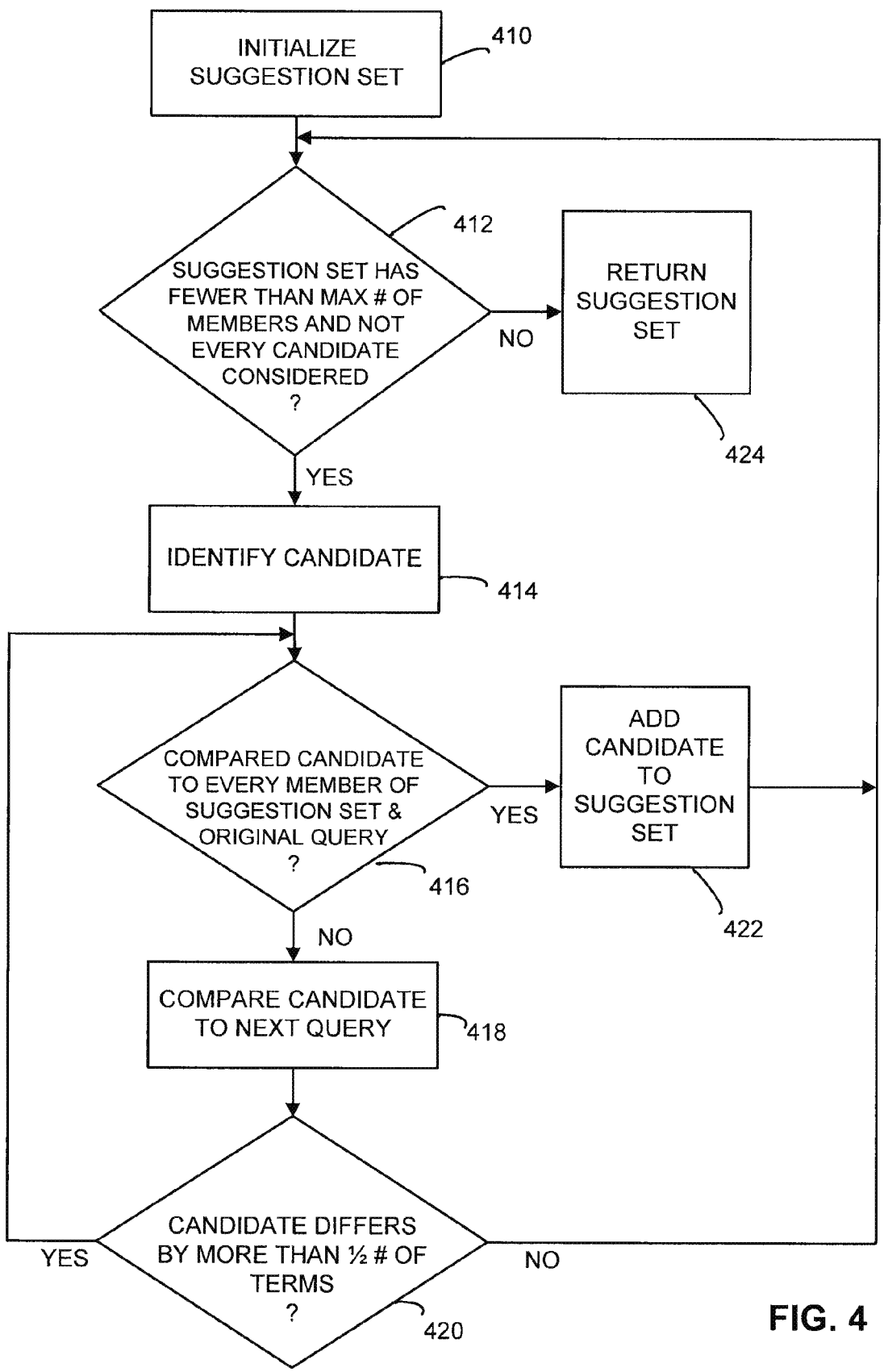
FIG. 4 is a flow diagram illustrating steps performed by the filtering module in the search engine to generate a set of suggestion queries according to one embodiment.

FIG. 4 is a flow diagram illustrating steps performed by the filtering module 320 to generate a set of suggestion queries according to one embodiment. Those of skill in the art will recognize that other embodiments can perform the steps in different orders. Likewise, other embodiments can contain other and/or additional steps than the ones shown in FIG. 4.

The filtering module 320 initializes 410 the suggestion set. At this point, the suggestion set has no suggestion queries in it. The filtering module 320 also establishes an upper limit on the number of suggestion queries that can be in the set. This limit can be set by an administrator and might be, for example, five suggestions.

If 412 the suggestion set contains fewer than the maximum number of queries and not every candidate query has been considered, the filtering module 320 identifies 414 the highest-ranked previously-unconsidered candidate query. The filtering module 320 determines 416 whether the candidate query has been compared to every current member of the suggestion set and the original query. If 416 the candidate query has not been compared to these other queries, the filtering module 320 compares 418 the candidate query to the next suggestion set member or to the original query if it has already been compared to all suggestion set members. If 420 this comparison indicates that the candidate query differs by more than half as many terms from the other query, then the filtering module 320 returns to step 416 and continues to compare the candidate query to the remaining suggestion queries or the original query. If 416 the candidate query has been compared to every member of the suggestion set and the original query, and is sufficiently different from them all, then the filtering module 320 adds 422 the candidate to the suggestion set. If 420 the candidate query does not differ by more than half as many terms from one of the queries it is compared to, then the candidate is discarded and the flow returns to step 412. If 412 the suggestion set has reached the maximum number of members, or every candidate suggestion has been considered, the filtering module 320 returns 424 the suggestion set.

Algorithmically, the operation of the filtering module 320 can be described as:
Given: the set of terms in the end-user query u, and
    an ordered list of candidate queries L=($q_1$, $q_2$, ... $q_k$)
    MAX is the maximum number of suggestion queries to obtain
Output: set Z of suggestion queries
1. Initialize suggestion set Z=∅
2. j=1
3. While (j≦k and size (Z)<MAX) do
3.1 If ($|q_{j}-|_{q_j} \cap z|>0.5|z| \forall z \epsilon (Z \cup \{u\})$) then
3.1.1 Z=Z∪{$q_j$}
3.2 j=j+1
4. Return suggestion list Z
Here, |q| denotes the number of terms in query g and {u} denotes the set containing the set of terms in the query (i.e., the set of unique terms in u). Thus, the test in Step 3.1 adds another candidate query $q_j$ to the suggestion set only if it differs by more than half as many terms from any other query already in the suggestion list Z (as well as the original end-user query u). In other embodiments, the filtering module 320 can use different and/or additional tests to determine whether to add a candidate query to the suggestion set.

III. Process/Example

Figure 5:
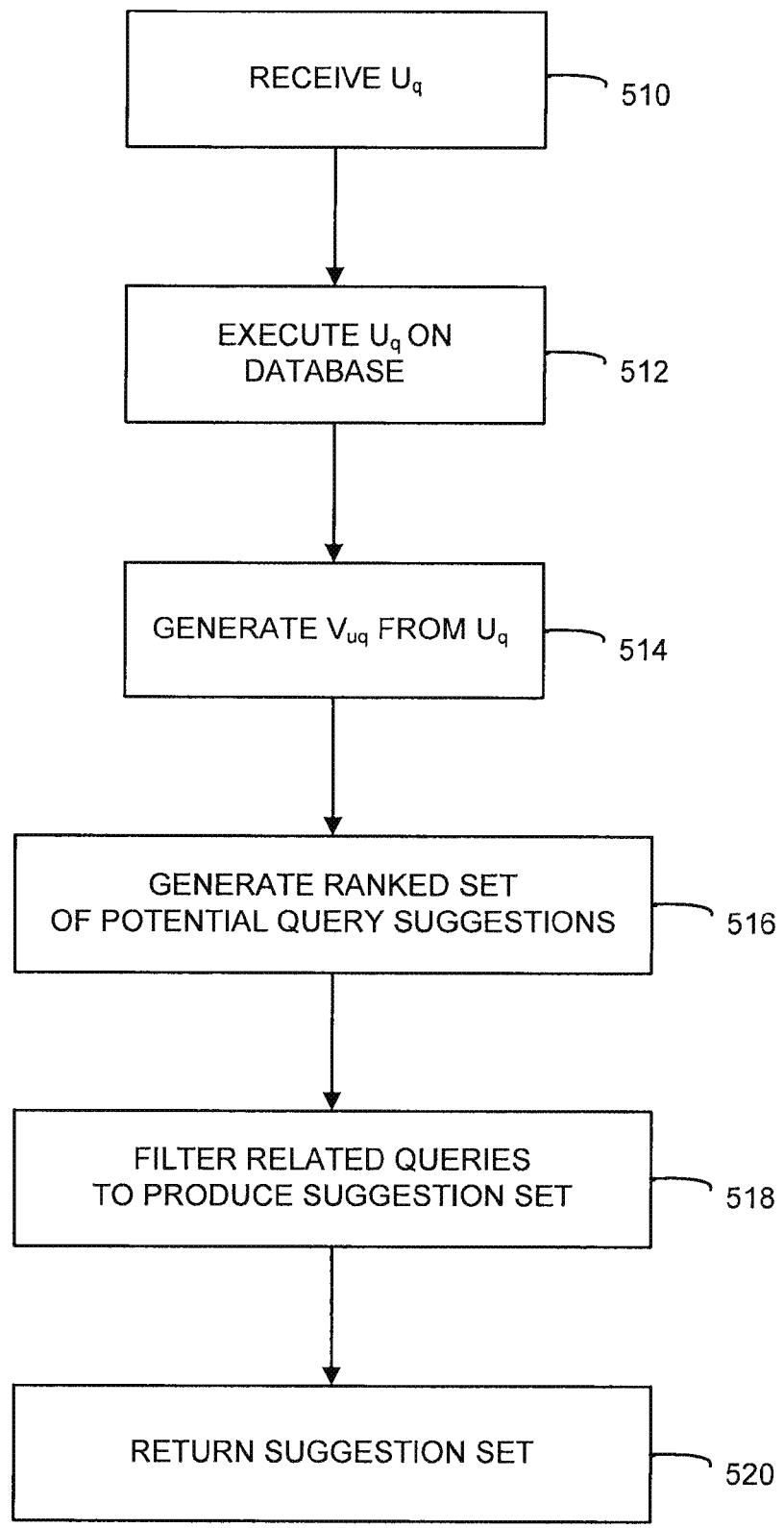
FIG. 5 is a flow chart illustrating the operation of the search engine according to one embodiment.

FIG. 5 is a flow chart illustrating the operation of the search engine 110 according to one embodiment. Those of skill in the art will recognize that other embodiments can perform the steps in different orders. Likewise, other embodiments can contain other and/or additional steps than the ones shown in FIG. 5.

The search engine 110 receives 510 an end-user query and executes 512 this query on the content database 112. In response to the query execution, the search engine 110 identifies a set of matching content. The search engine 110 utilizes a subset of the matching content, such as the top 50 matches, to generate 514 a query vector corresponding to the end-user query.

The search engine 110 creates a disjunction of the highest-weighted terms in the query vector and executes a search on the centroid repository 316 to identify a ranked set of matching centroids. These centroids are transformed into their original queries, which thereby generates 516 a ranked set of candidate queries. The search engine 110 then filters 518 the candidate queries to produce a set of suggestion queries. In one embodiment, the search engine 110 returns 520 the suggestion queries to the end-user contemporaneously with the search results.

For example, assume that the query received from the end-user is "mars exploration." Also assume that the top four candidate queries are: "mars attacks," "rover mission," "mars rover 2003," and "mission to mars nasa." In this example, the search engine 110 seeks to generate two query suggestions for the end-user.

The search engine 110 first considers "mars attacks." This query is not added to the suggestion set because
|"mars attacks"|=2
"mars attacks"∩"mars exploration"="mars"
|"mars"|=1, and 2−1=1 which is not greater than 0.5*|"mars exploration"|=1.
The search engine 110 next considers "rover mission." This query is added to the suggestion set since
|"rover mission"|=2
"rover mission"∩"mars exploration"=" "
|" "|=0, and 2−0=2, which is greater than 0.5*|"mars exploration"|=1.
Next, the search engine 110 considers "mars rover 2003." First, the search engine considers the query's difference with "mars exploration":
|"mars rover 2003"|=3
"mars rover 2003"∩"mars exploration"="mars"
|"mars"|=1, and 3−1=2 which is greater than 0.5*|"mars exploration"|=1.
Second, the search engine 110 considers the query's difference with "rover mission" (which is in the suggestion set):
|"mars rover 2003"|=3
"mars rover 2003"∩"rover mission"="rover"
|"rover"|=1, and 3−1=2 which is greater than 0.5*|"rover mission"|=1.
Since both these test pass, the search engine 110 adds "mars rover 2003" to the suggestion set. Since the set now contains two suggestions, it has reached maximum size and the suggestion queries, "rover mission" and "mars rover 2003" are returned to the end-user.

In sum, the search engine 110 filters candidate queries to identify ones that are likely to be meaningful to the end-user. In other embodiments, the techniques described here can be used in other contexts. For example, the techniques can be used to select targeted advertisements from a pool of potential advertisements. For purposes of this description, assume that the term "suggestion" also includes keywords that are used as targeting criteria for advertisements.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method, comprising:
   receiving an original query;
   selecting a plurality of documents responsive to the original query according to a ranking of the respective documents;
   generating a plurality of term vectors, the plurality of term vectors including a term vector for each document;
   truncating each term vector to include only highest-weighted terms from the respective document to provide a plurality of truncated term vectors;
   combining the plurality of truncated term vectors containing the highest-weighted terms to produce a search query centroid;
   searching a centroid repository for previously stored centroids matching the search query centroid;
   converting each of a first number of the most highly-ranked centroids into a respective candidate query;
   examining the candidate queries;
   adding each candidate query to a set of query suggestions if the respective candidate query contains a threshold number of terms that are not included in the original query; and
   providing the set of query suggestions in response to the original query.

2. The method of claim 1, wherein the search query centroid is a vector of the most common terms among the terms in the plurality of truncated term vectors.

3. The method of claim 1, wherein examining further includes examining the candidate queries in a ranked order.

4. The method of claim 1, further comprising:
   calculating a dot product of each previously stored centroid and the search query centroid, the dot product indicating a degree of similarity between each previously stored centroid and the search query centroid; and
   sorting the previously stored centroids by the respective dot products to produce a ranked list of centroids, where the most highly-ranked centroids most closely match the search query centroid.

5. The method of claim 1, further comprising:
   adding the candidate query to the set of query suggestions when $(|q_j|-|q_j \cap z|>0.5|z| \forall z \in (Z \cup \{u\}))$, where $q_j$ represents terms in an examined candidate, z represents terms in the set of query suggestions Z, and $\{u\}$ represents a set containing the set of terms in the original query.

6. The method of claim 1, wherein the set of query suggestions comprises a suggested query that is likely to be meaningful to an end-user.

7. The method of claim 1, further comprising:
   generating a disjunction including an additional number of highest-weighted terms in the search query centroid;
   wherein searching the centroid repository for previously stored centroids comprises searching the centroid repository for previously stored centroids that match the disjunction.

8. A system comprising:
   a non-transitory storage device coupled to the one or more computers having instructions stored thereon which, when executed by the one or more computers, cause the one or more computers to perform operations comprising:

receiving an original query;

selecting a plurality of documents responsive to the original query according to a ranking of the respective documents;

generating a plurality of term vectors, the plurality of term vectors including a term vector for each document;

truncating each term vector to include only highest-weighted terms from the respective document to provide a plurality of truncated term vectors;

combining the plurality of truncated term vectors containing the highest-weighted terms to produce a search query centroid;

searching a centroid repository for previously stored centroids matching the search query centroid;

converting each of a first number of the most highly-ranked centroids into a respective candidate query;

examining the candidate queries;

adding each candidate query to a set of query suggestions if the respective candidate query contains a threshold number of terms that are not included in the original query; and providing the set of query suggestions in response to the original query.

9. The system of claim 8, wherein the search query centroid is a vector of the most common terms among the terms in the plurality of truncated term vectors.

10. The system of claim 8, wherein examining further includes examining the candidate queries in a ranked order.

11. The system of claim 8, further comprising:

calculating a dot product of each previously stored centroid and the search query centroid, the dot product indicating a degree of similarity between each previously stored centroid and the search query centroid; and sorting the previously stored centroids by the respective dot products to produce a ranked list of centroids, where the most highly-ranked centroids most closely match the search query centroid.

12. The system of claim 8, wherein the operations further comprise:

adding the candidate query to the set of query suggestions when $(|q_j|-|q_j \cap z|>0.5|z| \forall z \in (Z \cup \{u\}))$, where $q_j$ represents terms in an examined candidate, z represents terms in the set of query suggestions Z, and $\{u\}$ represents a set containing the set of terms in the original query.

13. The system of claim 8, wherein the set of query suggestions comprises a suggested query that is likely to be meaningful to an end-user.

14. The system of claim 8, wherein the operations further comprise:

generating a disjunction including an additional number of highest-weighted terms in the search query centroid;

wherein searching the centroid repository for previously stored centroids comprises searching the centroid repository for previously stored centroids that match the disjunction.

15. A computer program product having a non-transitory storage device having executable computer program instructions recorded thereon for providing suggestions to a client computer, the computer program instructions configured to implement a method comprising:

receiving an original query;

selecting a plurality of documents responsive to the original query according to a ranking of the respective documents;

generating a plurality of term vectors, the plurality of term vectors including a term vector for each document;

truncating each term vector to include only highest-weighted terms from the respective document to provide a plurality of truncated term vectors;

combining the plurality of truncated term vectors containing the highest-weighted terms to produce a search query centroid;

searching a centroid repository for previously stored centroids matching the search query centroid;

converting each of a first number of the most highly-ranked centroids into a respective candidate query;

examining the candidate queries;

adding each candidate query to a set of query suggestions if the respective candidate query contains a threshold number of terms that are not included in the original query; and providing the set of query suggestions in response to the original query.

16. The computer program product of claim 15, wherein the search query centroid is a vector of the most common terms among the terms in the plurality of truncated term vectors.

17. The computer program product of claim 15, wherein examining further includes examining the candidate queries in a ranked order.

18. The computer program product of claim 15, wherein the operations further comprise:

calculating a dot product of each previously stored centroid and the search query centroid, the dot product indicating a degree of similarity between each previously stored centroid and the search query centroid; and sorting the previously stored centroids by the respective dot products to produce a ranked list of centroids, where the most highly-ranked centroids most closely match the search query centroid.

19. The computer program product of claim 15, wherein the operations further comprise:

adding the candidate query to the set of query suggestions when $(|q_j|-|q_j \cap z|>0.5|z| \forall z \in (Z \cup \{u\}))$, where $q_j$ represents terms in an examined candidate, z represents terms in the set of query suggestions Z, and $\{u\}$ represents a set containing the set of terms in the original query.

20. The computer program product of claim 15, wherein the set of query suggestions comprises a suggested query that is likely to be meaningful to an end-user.

21. The computer program product of claim 15, wherein the operations further comprise:

generating a disjunction including an additional number of highest-weighted terms in the search query centroid;

wherein searching the centroid repository for previously stored centroids comprises searching the centroid repository for previously stored centroids that match the disjunction.

* * * * *